United States Patent [19]

Nogami et al.

[11] Patent Number: 4,510,216
[45] Date of Patent: Apr. 9, 1985

[54] ELECTROCHEMICAL BATTERY INCLUDING A PRODUCT OF ACTIVATED CARBON FIBER AS AN ELECTRODE

[75] Inventors: Takashi Nogami, Toyonaka; Masayoshi Nawa, Wakayama, both of Japan

[73] Assignee: Kao Corporation, Tokyo, Japan

[21] Appl. No.: 541,024

[22] Filed: Oct. 12, 1983

[30] Foreign Application Priority Data

Feb. 8, 1983 [JP] Japan .................. 58-18160

[51] Int. Cl.³ ............................................. H01M 6/14
[52] U.S. Cl. ................................. 429/101; 429/194; 429/199
[58] Field of Search ............... 429/101, 105, 194–196, 429/197, 198, 218, 199, 127

[56] References Cited

U.S. PATENT DOCUMENTS

| | | | |
|---|---|---|---|
| 3,447,968 | 6/1969 | Rightmire | 429/112 |
| 3,852,113 | 12/1974 | Yokota et al. | 429/194 X |
| 3,922,174 | 11/1975 | Heller | 429/196 |
| 3,928,067 | 12/1975 | Broadhead et al. | 429/198 X |
| 4,029,854 | 6/1977 | Walsh et al. | 429/101 |
| 4,221,834 | 12/1980 | Zypancic | 429/105 |
| 4,224,389 | 9/1980 | Peled | 429/194 |
| 4,243,733 | 1/1981 | Brennan | 429/194 |

Primary Examiner—Anthony Skapars
Attorney, Agent, or Firm—Oblon, Fisher, Spivak, McClelland & Maier

[57] ABSTRACT

Disclosed herein is an electrochemical battery having electrodes immersed in an organic solvent electrolyte solution so that the electromotive force is generated by doping to and/or undoping from said electrodes.

One electrode is made of metal which is electrochemically equilibrated with cations in the electrolyte, and the other electrode is made of carbon molded product having a specific surface area of 100 to 2,500 m²/g.

The electrodes according to this invention are capable of accepting a large quantity of doping, light in weight and easy to handle.

4 Claims, 4 Drawing Figures

ELECTROCHEMICAL BATTERY INCLUDING A PRODUCT OF ACTIVATED CARBON FIBER AS AN ELECTRODE

BACKGROUND OF THE INVENTION (i) Field of the Invention:

This invention relates to an electrochemical battery. More specifically, it relates to a battery making use of a metal and a product of carbon fiber having a specific surface area of 100 to 2,500 $m^2/g$ (hereinafter called "the product of activated carbon fiber") as electrodes.

(ii) Description of the Prior Art:

Reflecting the ever-increasing serious concern on the matter of energy in recent years, there has arisen a strong demand for the development of a light weight and high energy density battery of a new type.

As a study similar to the present invention, it has been reported to use polyacetylene as an electrode of a battery. In some instances, use of polyacetylene seemed to have succeeded to draw out sufficient performance as batteries. Polyacetylene is however accompanied by such shortcomings that polyacetylene per se is unstable and no industrial preparation process has yet been found out for polyacetylene and the synthesis of polyacetylene is relatively difficult even on a laboratory scale.

SUMMARY OF THE INVENTION

With the foregoing in view, the present inventors have carried out an extensive investigation in order to obtain a battery employing electrodes which are readily available from industrial sources and are stable, having a large constant electromotive force and voltage and constructible into a light-weight battery. As a result, it has been found that the above object of the present invention can be achieved by using, as electrodes, a specific metal and a product of carbon fiber having a specific structure.

Accordingly, the present invention provides an electrochemical battery including electrodes immersed in a solution of an electrolyte dissolved in an organic solvent and capable of producing an electromotive force by doping and/or undoping one of the electrodes, in which battery a metal electrochemically equilibrated with cations in the electrolyte is used as an anode and a product of activated carbon fiber, which is a product of carbon fiber having a specific surface area of 100 to 2,500 $m^2/g$, is used as a cathode.

The present invention makes it possible to use an electromotive force to be produced in the course of doping a carbon material having a specific structure, especially a product of activated carbon fiber, by employing the product of activated carbon fiber as an electrode and a simple metal substance as its counterpart electrode or to utilize an electromotive force to be produced in the course of a discharge by externally applying a voltage to the battery to dope the carbon material into the p-type and then causing the battery to discharge a current.

DETAILED DESCRIPTION OF THE INVENTION AND PREFERRED EMBODIMENTS

Figure 1:
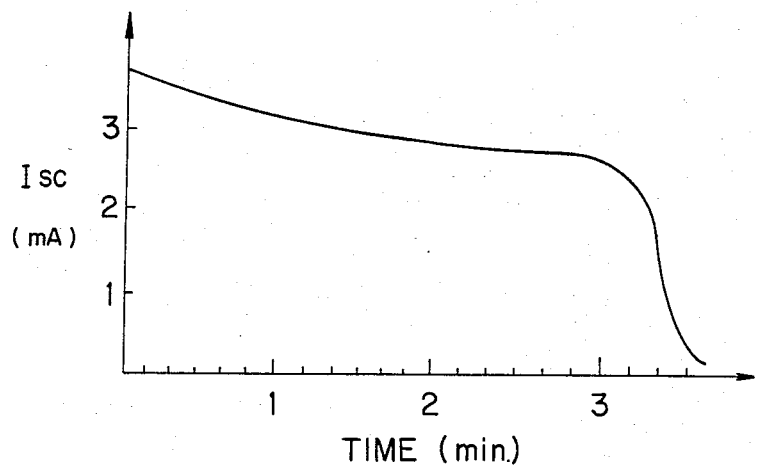
FIG. 1 is a graph obtained by plotting the measurement data in Example 1.

As illustrative electrolytes useful in the practice of this invention, may be mentioned those commonly known in the art, for example, tetraalkylammonium salts (counter anions: perchlorate ion, tetrafluoroborate ion, hexafluorophosphate ion, hexafluorothallate ion, hexafluoroarsenate ion, hexafluoroantimonate ion, thiocyanate ion, halogen ions, nitrate ion, sulfate ion, rhenium tetraoxide ion, etc.); alkali metal salts and alkaline earth metal salts (counter anions: the same ions as mentioned above); and halogen salts, perchlorates and nitrates of transition metals, rare earth metals and noble metals; etc.

On the other hand, it is feasible to use organic solvents commonly employed in batteries in the present invention, including dimethyl sulfoxide, acetonitrile, propylene carbonate, 4-butyrolactone, formamide, dimethylformamide, methylformamide, tetrahydrofuran, 1,2-dimethoxyethane, etc. The solvent useful in the present invention is limited to organic solvents and mentioned above, because water causes gases to occur and induces corrosion and, if the electrolyte solution should be accidentally leaked, the device equipped with the thus-leaked battery is seriously damaged.

In the present invention, a product of activated carbon fiber is used as one of the electrodes. The term "product of activated carbon fiber" as used herein means a product of carbon fiber of a structure that has a specific surface area of 100 to 2,500 $m^2/g$. The product of activated carbon fiber may be carbon fibers having a specific surface area of 100 to 2,500 $m^2/g$. Among products of activated carbon fiber, a sheet-like molding formed of carbon fibers having diameters in the range of 10 to 20 $\mu m$ is preferred. Its structure may be in the form of felt, paper of honeycomb. A product of activated carbon fiber having a particularly high effect out of such products of activated carbon fiber pertaining to the present invention is a sheet of carbon fibers having a number of pores of 10 Å or so in diameter and a specific surface area of 1,000 to 2,000 $m^2/g$. These activated carbon fibers individually have a fibrile structure and an extremely large surface area. Therefore, the doping can be achieved to a significant extent when doping the sheet with a dopant in accordance with electrochemical means.

Any metals may be used as electrodes in the present invention. As preferable metals, may however be mentioned alkali-metals, alkaline earth metals, aluminum and the like. As illustrative alkali metals and alkaline earth metals, may be mentioned lithium, potassium, rubidium, cesium, barium, strontium, calcium, sodium, magnesium, etc. Among such metals, lithium is used with preference for obtaining a high voltage and reducing the weight of a battery.

A separator may be employed in the present invention so that the cathode and anode can be isolated from each other without failure. It is preferred to use such a separator for the prevention of short-circuiting particularly when making the battery smaller or constructing the battery into a thin shape. It is more preferable to use a porous separator in order to maintain the electrolyte solution. Whenever a separator is used, it is necessary to make a suitable selection as to the separator, for example, the mechanical strength in accordance with its application field and shape.

The battery according to this invention uses an electrode made of a simple metal substance as a counterpart electrode for an electrode which is a product of activated carbon fiber. When these electrodes are immersed in an electrolyte solution containing metal ions, electromotive forces are produced in the courses that the simple metal substance are dissolved as ions in the solution and the product of activated carbon fiber is doped or undoped with ions. The above electromotive forces are used as a battery.

Use of an activated carbon fiber product as an electrode in the present invention has brought about such a merit that it is equipped with the following various properties which are desirable for electrodes:

(1) Products of activated carbon fiber are produced on a large scale and are thus readily available;

(2) Activated carbon is extremely stable from the chemical viewpoint;

(3) Products of activated carbon fiber are commercially available in various forms such as felt-like forms, sheet-like forms and honeycomb-shape. They can thus be used in a wide application field when batteries are designed;

(4) Products of activated carbon fiber can be doped to considerable extents;

(5) Products of activated carbon fiber exhibit high levels of electric conductivity, which are essential for electrode materials;

(6) Products of activated carbon fiber are light in weight and easy to handle; and (7) Use of products of activated carbon fiber permits to construct thin and flexible batteries.

Among these merits, the merit (4) has put a special value on the present invention. As has been described above, a product of activated carbon fiber useful in the practice of this invention has a specific surface area of 100 to 2,500 m$^2$/g. Therefore, it can be doped to a considerable extent in accordance with the electrochemical method. Use of such a product of activated carbon fiber is hence advantageous when producing a secondary battery which can output a great deal of energy.

Since the battery according to this invention has such merits as mentioned above, it can be used in an extremely wide application field. Therefore, general batteries may be replaced by batteries according to this invention. Batteries according to this invention may for example be used in the following application fields. Making for example use of the merit that they are light in weight, they may for example be used as engine-starting power sources in general automobiles, motorcycles, motorboats, helicopters, jet planes, propeller planes, etc; portable power sources for electric cars such as forklift trucks, carts, tractors and golf carts, street cars, trains, vessels, etc.; power sources in portable devices and instruments such as portable television sets, portable VTR sets, radios, cassette taperecorders, watches and clocks, electric calculators, strobes, transceivers, pocket bells, etc.; power sources for cameras, for example, electronic shutters, film winders, exposure meters and strobes; power sources for electric home appliances such as electric shavers, massagers, interphones, hearing aids, lighters, electric clippers and the like; backup power sources for computer memories; power sources in lighting devices such as general flash lights, search lights, work lamps, emergency lights, singnal lights, fishing lamps, buoy lights, beacons, etc.; everyday or emergency stationary power sources for crime- and accident-preventive systems and devices, fire alarms, warning systems, telephones and other communication facilities; and power sources for electric tools, medical instruments, portable radiotelephones, various measurement instruments, etc. Besides, batteries of the present invention may also be used in combination with solar cell to use the solar cell effectively. Since batteries according to this invention are flexible and can thus be formed with ease into any desired shapes, are light in weight and can also be formed into thin configuration, for example, sheets, they may be applied to suits, hats, caps, water-proofed canvas, floors, ceilings, walls, house exteriors and the like by glueing them on floor or wall surfaces or sewing them in cloth or fabric. The above feature of the cells according to this invention can thus facilitate their application, especially, their utilization in combination with solar batteries.

The present invention will hereinafter be described more specifically by the following Examples.

EXAMPLE 1

When cloth of activated carbon fibers and lithium metal were used as electrodes and tetraphdrofuran and a 0.3-M lithium perchlorate solution were used respectively as a solvent and electrolyte solution, were achieved $Voc = 3.1$ V and $Isc(initial) = 3.7$ mA. When the above system was short-circuited, Isc varied as shown in the following table along the passage of time.

| Seconds | 0 | 10 | 20 | 30 | 40 | 50 | 60 | 70 |
|---|---|---|---|---|---|---|---|---|
| Isc (mA) | 3.7 | 3.55 | 3.45 | 3.40 | 3.35 | 3.28 | 3.22 | 3.15 |
| Seconds | 80 | 90 | 100 | 110 | 120 | 150 | 180 | 210 |
| Isc (mA) | 3.10 | 3.05 | 3.00 | 2.95 | 2.88 | 2.75 | 2.60 | 0.3 |

The above measurement results can be graphically shown as illustrated in FIG. 1. This figure indicates apparently that the above battery has invariance in voltage.

EXAMPLE 2

Two sheets of activated carbon fibers (KF-Paper P175"; product of Toyobo Co., Ltd.), each of 1 cm × 1 cm (about 7 mg), were held by an alligator clip and immersed at room temperature in a 0.3 M lithium perchlorate solution in propylene carbonate. The electrodes were connected to an external power source and a constant current of 1 mA was caused to pass for 1 hour between the electrodes, thereby preparing activated carbon fibers doped with perchlorate ions. When the thus-prepared activated carbon fibers were used as anode in combination with lithium metal as cathode, and a 0.3 M lithium perchlorate in propylene carbonate was employed as an electrolyte solution, were achieved $Voc = 3.2$ V and $Isc = 3.45$ mA.

EXAMPLE 3

Cloth of activated carbon fibers and an aluminum plate were provided as electrodes. When they were immersed in a 1.3 M lithium perchlorate solution in propylene carbonate, were achieved Voc=0.6 V and Isc=0.3 mA.

Example 4

The following is an experiment carried out by way of example on a secondary battery.

Figure 2:
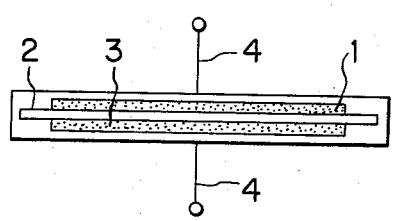
FIG. 2 is a cross-sectional view of the cell employed in Example 4, in which numeral 4 indicates terminals, numeral 2 is a separator, numeral 1 is lithium metal (cathode), and numeral 3 is a product of carbon fiber (anode)

A battery was constructed using lithium and cloth of activated carbon fibers (specific surface area: 2,500 m$^2$/g; 33.4 cm$^2$) respectively as cathode and anode, and employing a 1.0 M propylene carbonate solution of lithium perchlorate. The battery was disposed as depicted in FIG. 2, using a glass fiber filter as a separator and platinum wires as leads. After holding the thus-formed cell in a Teflon-made holder, the resultant unit was hermetically sealed in a glass container. Incidentally, the cutting-out operation of lithium and its assembly into the hermetically-sealed unit were carried out in an argon dry box.

The thus-fabricated cell was charged by an external power source, connecting the activated carbon fibers and lithium electrode to the positive and negative terminals of the external power source. Then, the external power source was disconnected and a load was connected between the electrodes. The load worked successfully.

When the load was connected, the electromotive force was as high as 4.2 V and the theoretical energy density was 325 wh/kg which is greater than the theoretical energy density of a lead acid storage battery.

To examine the durability of the battery, 50 minutes charge and 50 minutes discharge were repeated with a current of 4 mA. The discharge was interrupted at the point where the voltage became below 3.2 V. The voltage change during charge and discharge was plotted as a function of time at fifth and 50th cycles.

Figure 3:
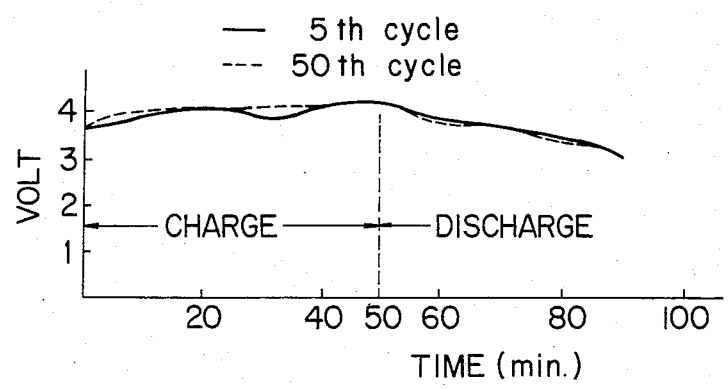
FIG. 3 is a graphical representation of the voltage change after charge and discharge to demonstrate durability of the battery.
Figure 4:
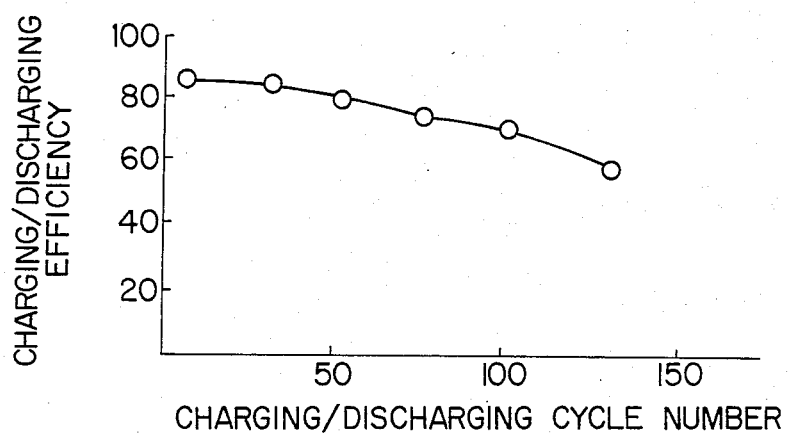
FIG. 4 is a graph showing the relationship between charging efficiency and cycle number.

FIG. 4 is a plot of the relationship between charging efficiency and cycle number in the charging and discharging test shown in FIG. 3.

Charging efficiency was calculated according to the following equation:

$$\text{Charging efficiency} = \frac{\text{discharging current (4 mA)} \times \text{discharging time}}{\text{charging current (4 mA)} \times \text{charging time}} \times 100$$

What is claimed is:

1. An electrochemical battery including electrodes immersed in a solution which contains an electrolyte dissolved therein and capable of producing an electromotive force by doping or undoping one of the electrodes, characterized in that a metal is used as one electrode and a product of activated carbon fiber having a specific surface area of 1,000 to 2,500 m$^2$/g is used as the other electrode.

2. An electrochemical battery as claimed in claim 1, wherein the metal is an alkali metal or alkaline earth metal.

3. An electrochemical battery as claimed in claim 2, wherein the metal is an alkali metal.

4. An electrochemical battery as claimed in claim 3, wherein the metal is lithium.

* * * * *